United States Patent [19]

Kim

[11] Patent Number: 4,926,465
[45] Date of Patent: May 15, 1990

[54] METHOD FOR INDICATING A COMMUNICATING DURATION OF AN OFFICE LINE IN A KEYPHONE SYSTEM

[75] Inventor: Suk-Joon Kim, Seoul, Rep. of Korea

[73] Assignee: Samsung Electronics Co., Ltd., Suwon, Rep. of Korea

[21] Appl. No.: 359,342

[22] Filed: May 31, 1989

[30] Foreign Application Priority Data

May 31, 1988 [KR] Rep. of Korea .................. 1988-6496

[51] Int. Cl.$^5$ .................... H04M 15/28; H04M 15/34
[52] U.S. Cl. .................................... 379/131; 379/157; 379/140; 379/387; 379/441
[58] Field of Search ............... 379/131, 157, 174, 130, 379/140, 387, 396, 441

[56] References Cited

U.S. PATENT DOCUMENTS 4,656,657  4/1987  Hunsicker ...................... 379/131 X
4,813,065  3/1989  Segala ............................. 37/130 X Primary Examiner—Stafford D. Schreyer
Attorney, Agent, or Firm—Fleit, Jacobson, Cohn, Price, Holman & Stern

[57] ABSTRACT

There is disclosed a method capable of indicating a communicating duration on a displaying means (LCD) of a key-phone upon a communication via the public telephone office line in a key-phone system. The method includes the steps of: a first process for driving a communicating duration starting timer and informing that communication is started; second process for initializing a buffer storing a communicating duration and driving the communicating duration increasing timer; third proces for driving said communicating duration increasing timer and then checking if it is in a state of a public telephone office line reserving, and terminating in a state of accumuating the communicating duration to a buffer; fourth process for producing present communicating duration data and transmitting the data to a key-phone; and fifth process for increasing a count value of communicating duration storing buffer, driving the communication increasing timer, and advancing to said third process.

11 Claims, 4 Drawing Sheets

METHOD FOR INDICATING A COMMUNICATING DURATION OF AN OFFICE LINE IN A KEYPHONE SYSTEM

BACKGROUND OF THE INVENTION

The present invention relates to a key-phone system, and in particular to a method capable of indicating a communicating duration on a display of a key-phone subset upon a public telephone office line transmission.

In a conventional key-phone system, when a user of a key-phone subset is communicating through a public telephone office line, he or she could not know correctly the calling time of the public telephone office line. Further, in a key-phone system having a particular function, even though it is possible to know the calling time of the public telephone office line, it has only been possible to confirm through a printer connected to the system after the communication. Therefore, in a state during the communication, since a communicator is not able to detect how long the communicating duration of the public telephone office line is elapsed, application of the public telephone office efficiently carried out.

OBJECT OF THE INVENTION

Therefore, it is an object of the present invention to provide a method capable of indicating a communicating duration of time by method of a displaying means (LCD) of a key-phone upon a communication via the public telephone office line in a key-phone system.

BRIEF DESCRIPTION OF DRAWINGS

For a better understanding of the invention, and to show how the same may be carried into effect, reference will now be made, by way of example, to the accompanying drawings, in which.

DETAILED DESCRIPTION OF A PREFERRED EMBODIMENT

Figure 1:
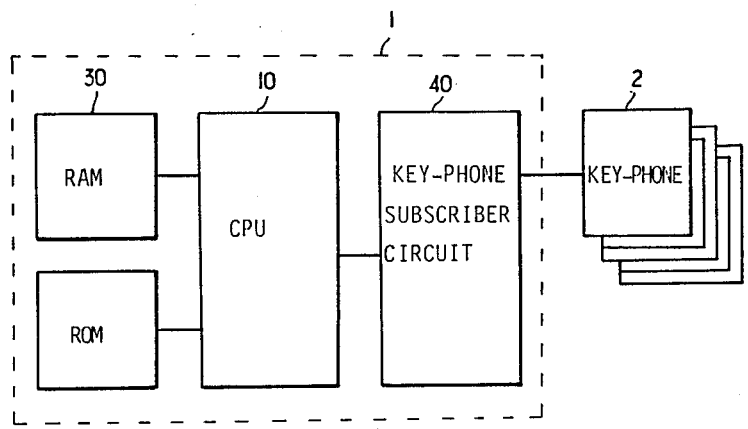
FIG. 1 is a block diagram illustrating a system for carrying out the present invention.

Hereinafter, the present invention will be described in detail. FIG. 1 is a block diagram illustrating a system for carrying out the invention, which includes: a central processing unit (CPU) 10 for controlling and processing a key-phone system; a ROM 20 for storing a program code of the system, a RAM 30 storing temporarily the data used in the system; a key-phone subscriber circuit 40 for executing an interface function of key-phone 2 which is mentioned hereinbelow and said central processing unit 10; key LED, LCD (liquid crystal display) and the like being attached, and a key-phone 2 which is a terminal device controlled by said central processing unit 10. In a configuration of said FIG. 1, the configuration of switching circuit, public telephone office line circuit, tone generating circuit and the like utilized for constructing a communication path are omitted, and only a part of the configuration for carrying out the present invention is illustrated.

Figure 2:
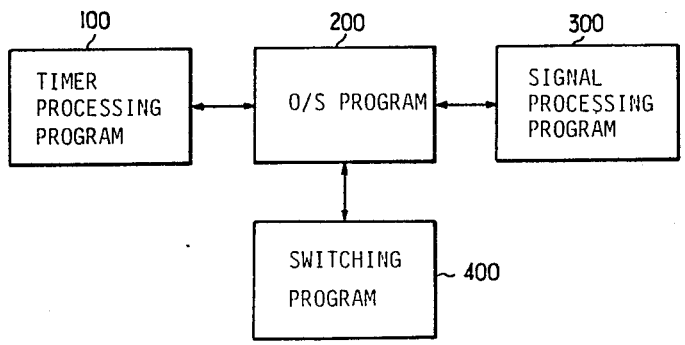
FIG. 2 is a block diagram illustrating an entire program configuration of a preferred embodiment, according to the present invention.

FIG. 2 is a block diagram illustrating an entire program configuration of a preferred embodiment, according to the present invention, which includes: a timer processing program 100 for checking a timer by every 100 ms when the timer is being driven, and transmitting a message whose time is already elapsed 100 ms to an after-mentioning exchanging program 400; an O/S program 200 for controlling a program of entire key-phone system; a signal processing program 300 for changing data through key-phone 2 and key-phone subscriber circuit 40; an exchanging program 400 for executing a communication time duration indication by executing a real exchanging operation.

Figure 3:
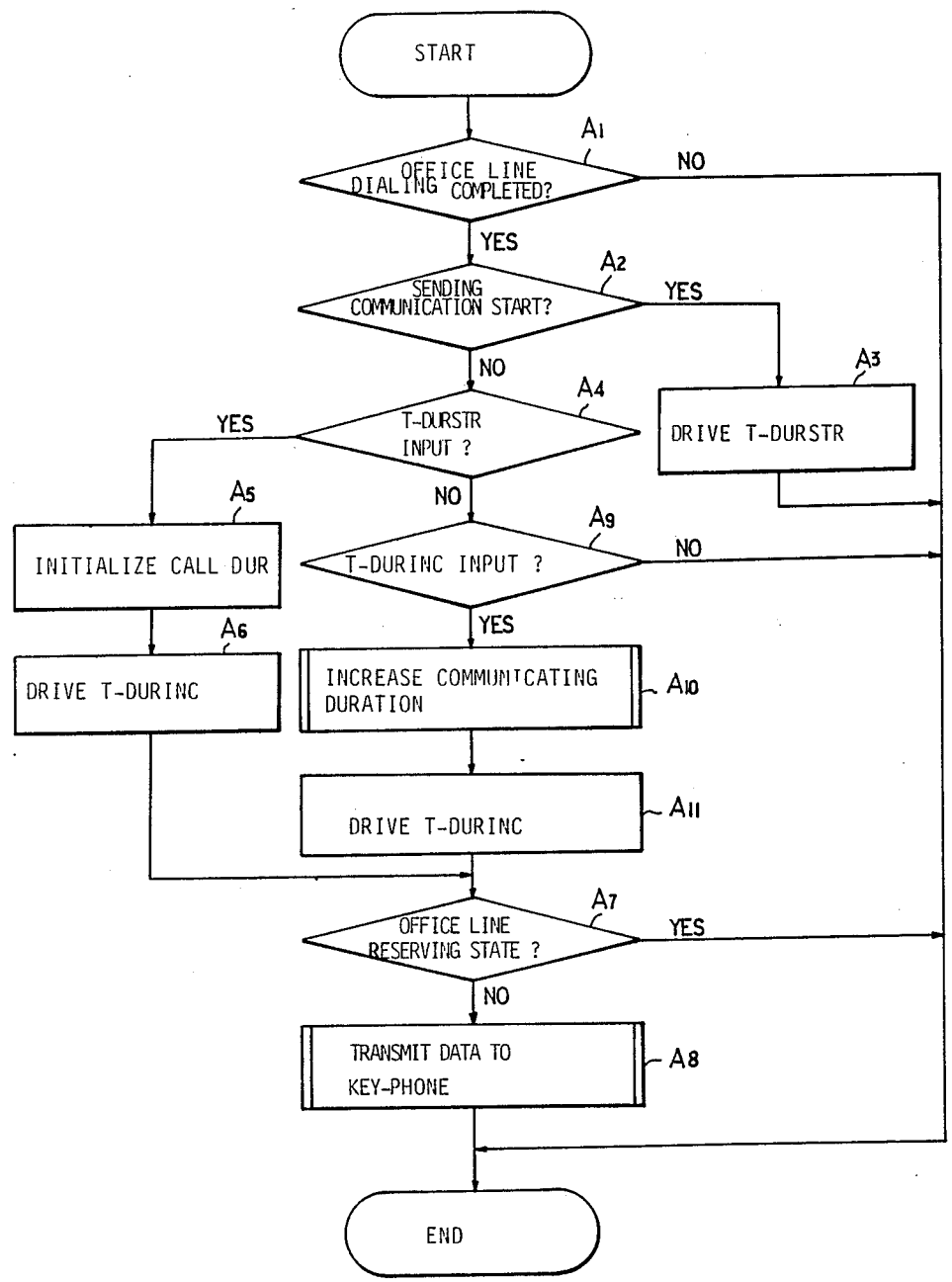
FIG. 3 is flow chart for a indication of a public telephone office line communication, according to the invention.

FIG. 3 is a flow chart to indicate communicating duration of time in a state of the public telephone office line sending according to the invention, which includes: a first process for checking whether or not it is a start of communication of the public telephone office line transmission, when it is a start of a public telephone office line transmission, driving a communication start timing timer, informing of a communication start timing, and then terminating; a second process for checking whether or not it is an input signal of a communication start timer when it is not a public telephone office line sending at said first process, when a driving signal of a communication start signal timer is inputted, initializing a communication time storing buffer, and driving a communication time increasing timer; a third process for checking whether or not it is a public telephone office line reserving state after executing said second process, when it is a public telephone office line reserving state, not transmitting the communication time data in a state accumulated with communication time, and then terminating; a fourth process for generating the communication time data when it is in public telephone office line communication state at said third process, and transmitting the data to the key-phone; and a fifth process for checking whether or not it is a driving signal input of a communication time increasing timer when it is not a driving signal input of a communication time start timer at said second process, storing a commuication increasing time value when a driving signal of a communication time increasing timer is being inputted, after driving a communication time increasing timer, and advancing to said third process.

Figure 4:
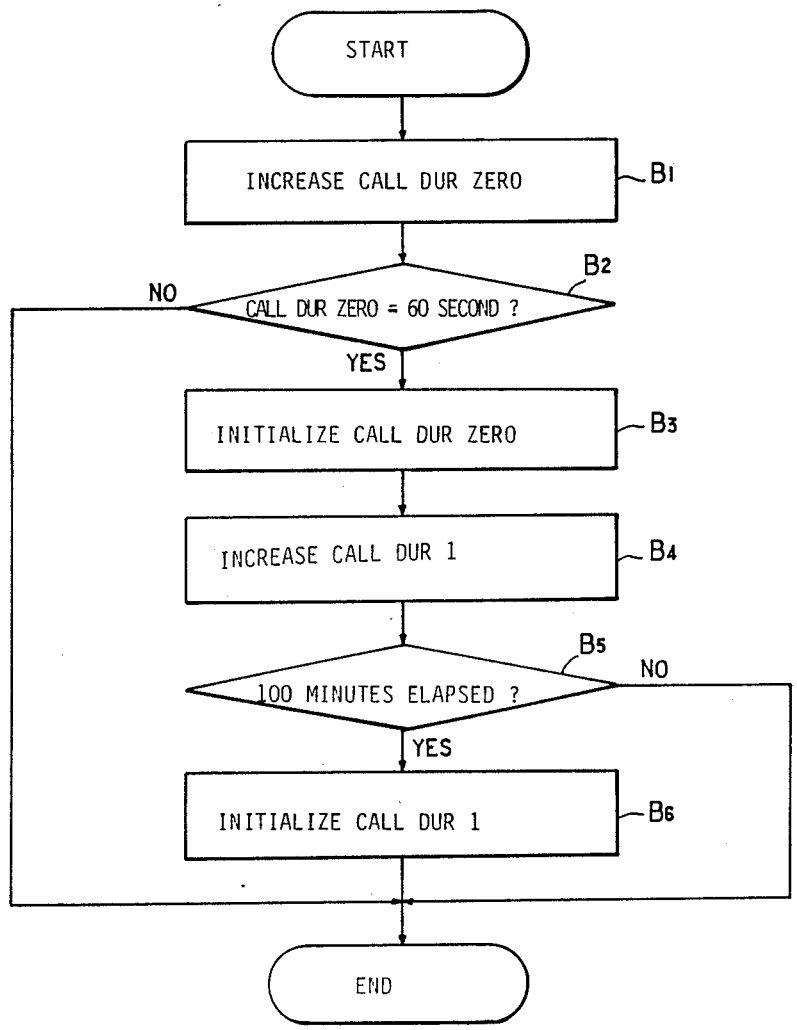
FIG. 4 is a flow chart of a count increasing for a communication time duration designating buffer in FIG. 3.

FIG. 4 is a flow chart of a communication increasing time value generation of the fourth process in FIG. 3, which includes: a first process for checking whether or not one minute is passed after increasing a buffer for storing "seconds", and if not, then terminating; a second process for increasing a minute storing buffer after initializing a second storing buffer when one minute is passed at said first process; and a third process for checking whether or not 100 minutes have passed after executing said second process, and terminating after initializing a minute storing buffer only when 100 minutes are elasped.

Figure 5:
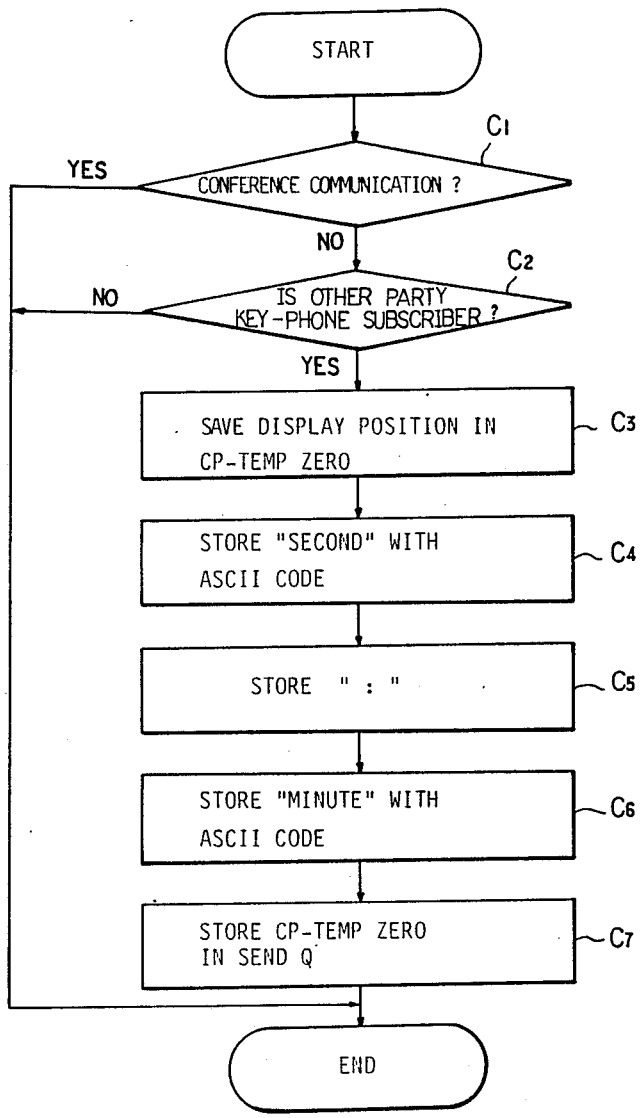
FIG. 5 is a flow chart for transmitting indicating data of a communicating duration in FIG. 3.

FIG. 5 is a flow chart of a communication time data generation of third process in FIG. 3, which includes: a first process for checking whether or not it is in conference communication. When it is in conference communication, terminating with ignoring a communication time indicating data; a second process for checking whether or not the side subscriber is a key-phone when it is in conference communication at said first process, when it is not, terminating and disregarding the communication time indicating data; and a third process for storing a communication time value into ASCII value when it is a key-phone at said second process and then storing to a send queue, and terminating.

The present invention will be described in detail according to above-described configuration with reference to FIGS. 1 to 5.

The central processing unit 10 executes data exchange and transmits and receives various kinds of signals and voices with a key-phone 2 that is a terminal equipment through a key-phone subscriber circuit 40. When a public telephone office line sending communication is started from said key-phone 2, the central processing unit 10 recognizes this through a corresponding port, after driving the timer and storing this into predetermined buffer of RAM 30, producing data for indicating a communication time per predetermined time, and transmitting to the key-phone subset 2.

In this invention, communication time indicating data generated per one second is rendered to transmit to the key-phone subset 2, and key-phone subset 2 is terminal to which is attached a display such as a LCD. When a public telephone office line sending communication is carried out through said key-phone subset 2, the flowing steps of this invention for indicating a communication time proceed as follows,:

When any of the key-phone subset 2 is hooked off when dialing a public telephone office line (local call, long distance trunk call, overseas call, etc.), at a step A1, the central processing unit 10 receives a dialing digit produced from corresponding key-phone subset 2 through a key-phone subscriber circuit 40 and a not shown DTMF receiver, and checks whether or not it has completed the public telephone office line dialing.

When the public telephone office line dialing is completed at said step A1, the central processing unit 10 advances to a step A2 and checks whether or not it is a public telephone office line sending communication start; when there is a response from a called party subscriber through a not shown public telephone office line circuit, it has to form a communication path through a switching circuit, and it is treated as a communication start from this time. At this stage when it is a start of sending communication at said step A2, at a step A3, a corresponding message is registered into a timer message queue TMSGQ for driving a communicating duration start indication timer T-DURSTR, setting a driving start flag and then terminating the process.

At this point, the system follows the processes, when it is not a sending communication start, of checking whether it is an input of communication duration indicating start timer T-DURSTR informing the public telephone office line communication start at a step A4, when it is a communicating duration indicating start timer input, advancing to a step A5, intializing a communicating duration storing buffers CALL DUR 0 and 1 of subscriber table (dynamic line control block: DLCB) contained in RAM 30, and at a step A6, driving a communicating duration increasing timer (timer duration increment: T-DURINC).

Each subscriber ends up having a suscriber table DLCB with a table storing all states of key-phone subscribers in above-description, therefore, there is a communicating duration storing buffer for storing the public telephone office line communicating duration within said subscriber table DLCB, and here, first communicating duration storing buffer 1 (call duration 1) stores "minutes", and secondly, communicating duration storing buffer 0 (call duration 0) stores "seconds". If said communicating duration increasing timer (T-DURINC) is driven upon increasing the communication duration by one second, the duration is decreased from timer program 100 in every 100 ms, and when duration becomes 0, timer value becomes passed over again to the exchange program 400 by a system control program 200.

After executing said step A6, at a step A7, checking whether or not it is a public telephone office line reserving state and, when it is a reserving state, terminating without transmitting data with respect to the communicating duration of corresponding key-phone subset 2. That is to say, though the data with respect to communicating duration of the public telephone office line sending communicating keeps being accumulated upon the public telephone office line reserving state, the data, however, are not transmitted to the corresponding key-phone. When it is released from the public telephone office line reserving state, the communicating duration data accumulated during that time is transmitted to the key-phone together therewith. Therefore when it is not the public telephone office line reserving state at said step A7, at a step A8, as shown in FIG. 5, the communication duration indicating data is produced and transmitted to the corresponding key-phone 2.

The central processing unit 10 first checks at a step C1 whether or not a corresponding subscriber is in a conference communication and, when it is in a conference communication, terminates without transmitting the communicating duration indicating data to the corresponding subscriber side, and when it is not in a conference communication advances to a step C2, and checks whether the other party subscriber is a key-phone subscriber. At said step C2 also, when the other party subscriber is not a key-phone subscriber but a general telephone subscriber, terminates without transmitting the communication duration indicating data.

Thereafter, when a subscriber of the other party is a key-phone subscriber and is not in a state of conference communication, at a step C3, a display position value of the key-phone subset 2 is stored to a buffer of RAM 30 used in an exchange program temporarily (call pressing temporary buffer 0: CP-TEMP 0), at a step C4, "second" unit data are stored with ASCII code value to a next buffer of said buffer (CP-TEMP 0), and at a step C5, it stores data ":", at a step C6, stores "minute" unit data with ASCII value, at a step C7, stores said buffer (CP-TEMP 0) value to a send queue SEND Q of RAM 30 so as to transmit to a corresponding key-phone subset 2 at a signal processing program 300, and then terminates the process.

Said send queue SEND Q is the queue for storing the data which is sending to the key-phone subset, the data stored in a send queue SEND Q are transmitted to the key-phone subset by a signal process program 300 executed every 10 ms, and it is displayed at a LCD display with a present public telephone office line communicating duration.

At said step A4, when a communicating duration indicating timer (T-DURSTR) is not inputted, at a step A9, it checks whether or not the communicating duration increasing timer (T-DURINC) is inputted, when it is not, terminates the process, and when the communicating duration increasing timer (T-DURINC) is inputted, advances to a step A10 to execute the steps as shown in FIG. 4.

Firstly, since the communicating duration increasing timer is driven at every second, in a step B1, it increases a value of "second" storing buffer (CALL DUR 0) by one, and at a step B2, checks whether or not said second storing buffer value has reached 60 second, i.e., one minute, when it has not reached one minute (60 second), completes the process and terminates. At said step B2, when it is elapsed one minute, at a step B3, it initializes a "second" storing buffer (CALL DUR 0) to 0, subsequentialy increases a "minute" storing buffer (CALL DUR 1) at a step B4, at a step B5 checks whether or not 100 minutes is elapsed through "minute" storing buffer, when it is not, terminating the process, when 100 minutes are elapsed, advances to a step B6 to initialize "minute" storing buffer (CALL DUR 1) to 0, and then terminates the process.

Thus, after executing the step A10 and increasing the communicating duration, advancing to a step A11, it drives the communicating duration increasing timer (T-DURINC) for the next state, and then advances to a step A7, as described above, checking whether or not the public telephone office line reserving state is present.

The present invention is a method capable of indicating a communicating duration through the display means LCD of corresponding key-phone subset 2 when any of the key-phone subscribers is carrying out a public telephone office line sending communication, according to its operation. Firstly, when a public telephone office line sending communication is started, the key-phone system drives a communicating duration indication starting timer and initializes "second" and "minute" storing buffer for representing the communicating duration, and then drives the communicating duration increasing timer.

When the communicating duration increasing timer is operated, it increases the communicating duration value, outputs to the corresponding key-phone subset and displays it on the display means LCD of the corresponding key-phone subset 2. When a public telephone office line reserving state is occurred, it increases the communicating duration value and even accumulates it to the duration storing buffer, hence, the corresponding communicating duration data is not transmitted to the corresponding key-phone. When the public telephone office line reserving state is released, it operates so as to transmit the data which has been accumulated so far to the corresponding key-phone.

As described above, when it is carried out that a public telephone office line sending from a key-phone system, it displays the communicating duration through a LCD display of the corresponding key-phone, so that a user can easily acknowledge communicating duration of the public telephone office line. Further, since the public telephone office line communication can be controlled with a pertinent duration based upon the invention, it is economical. More convenient and efficient public telephone office line utilization can be obtained, therefore, there is an advantage of providing a communication service with excellent quality.

The foregoing description shows only a preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A method of indicating communicating duration of use of a public telephone office line, comprising:

driving in response to completion of the dialing of a first subscriber's number on a public telephone office line controlled via a central processor using a key telephone set assigned a second subscriber's number, and connection by the central processing unit of the key telephone set with a receiver addressed by the first subscriber's number via the public telephone office line, a timer of the central processing unit with a start signal to enable the timer to count time of the duration of a communication between the key telephone set and the receiver via the public telephone office line, and indicating that communication between the key telephone set and the receiver has started;

initializing a buffer storing the count of time of the duration of the communication when said start signal is generated, and driving the timer with a driving signal;

driving said timer and then checking whether the public telephone office line is in a reserved state, terminating the count of time when the public telephone office line is in a reserved state and producing communicating duration data representing the count of time when the public telephone office line is conducting communication with the key telephone set;

increasing the value of the count of time stored in the buffer in response to said driving signal, thereafter driving the timer with the driving signal, and repeating said step of checking; and transmitting the data to the key telephone set if the public telephone office line is not in a reserved state.

2. The method of claim 1, comprising:

making a determination of whether or not one minute has elapsed after increasing a count of seconds of the communicating duration data stored in the buffer has increased by one;

initializing the count of second stored in the buffer to "0", when one minute of said count of time has elapsed, and increasing a count of minutes stored in the buffer by one; and initializing the count of minutes stored in the buffer to "0" only when one hundred minutes has elapsed after generation of said start signal.

3. The method of claim 1, further comprising:

checking whether or not the communication using the key telephone set is a conference communication via the public telephone office line, and when the communication using the key telephone set is a conference communication via the public telephone office line, terminating without transmitting the communicating duration data;

checking whether or not the public telephone office line communication is via a key-phone subscriber when the public telephone office line communication is not a conference communication, and terminating the process without transmitting the communicating duration data when the public telephone office line communication is not with a key-phone subscriber; and producing a position value for a display of a corresponding key-phone of duration data in units of "seconds" and "minutes", and transmitting the data to the corresponding key-phone.

4. A method of indicating communicating duration of use of a public telephone office line, comprising the steps of:

in response to reception by a central processor of a number assigned to a receiver on a public telephone office line controlled by the central processor, upon completion of dialing using a key telephone set, and connection by the central processing unit of the key telephone set with the receiver addressed by the number via the public telephone office line, driving a timer of the central processing unit with a start signal to enable the timer to make a count of time of the duration of a communication between the key telephone set and the receiver via the public telephone office line;

initializing the count of time of the duration of the office line communication when said start signal is generated;

driving said timer and then checking whether the public telephone office line is in a reserved state, terminating the count of time when the public telephone office line is in a reserved state and producing communicating duration data representing the count of time when the public telephone office line is conducting an office line communication with the key telephone set;

increasing the value of the count of time;

checking whether the office line communication via the public telephone office line is a conference communication, and when the office line communication is a conference communication terminating the count of time without transmitting the communicating duration data;

producing a position value for a display of a display at a corresponding key telephone set of communicating duration data in units of "seconds" and "minutes"; and transmitting the communicating duration data to the corresponding key telephone set if the public telephone office line is not in a reserved state.

5. The method of claim 4, further comprising the steps of:

checking whether the public telephone office line communication is with a key telephone subscriber when the public telephone office line communication is a conference communication, and terminating the process without transmitting the communicating duration data when the public telephone office line communication is not with a key telephone subscriber.

6. The method of claim 4, further comprising the steps of:

making a determination of whether or not one minute has elapsed after increasing a count of "seconds" of the communicating duration data by one;

initializing the count of "seconds" to "zero", when one minute of said count of time has elapsed, and increasing a count of "minutes" by one; and initializing the count of "minutes" to "zero" only when a fixed value of "minutes" has elapsed after generation of said start signal.

7. A method of indicating communicating duration of use of a public telephone office line, comprising the steps of:

in response to reception by a central processor of a number assigned to a receiver on a public telephone office line controlled by the central process, upon completion of dialing using a key telephone set, and connection by the central processing unit of the key telephone set with the receiver addressed by the number via the public telephone office line, driving a timer of the central processing unit with a start signal to enable the timer to make a count of time of the duration of a communication between the key telephone set and the receiver via the public telephone office line;

initializing the count of time of the duration of the office line communication when said start signal is generated;

driving said timer and then checking whether the public telephone office line is in a reserved state, terminating the count of time when the public telephone office line is in a reserved state and producing communicating duration data representing the count of time when the public telephone office line is conducting an office line communication with the key telephone set;

increasing the value of the count of time;

checking whether the public telephone office line communication is with a key telephone subscriber when the public telephone office line communication is a conference communication, and terminating the process without transmitting the communicating duration data when the public telephone office line communication is not with a key telephone subscriber;

producing a position value for a display of a display at a corresponding key telephone set of communicating duration data in units of "seconds" and "minutes"; and transmitting the communicating duration data to the corresponding key telephone set if the public telephone office line is not in a reserved state.

8. The method of claim 7, further comprising the steps of:

making a determination of whether one minute has elapsed after increasing a count of "seconds" of the communicating duration data by one;

initializing the count of "seconds" to "zero", when one minute of said count of time has elapsed, and increasing a count of "minutes" by one; and initializing the count of "minutes" to "zero" only when a fixed value of "minutes" has elapsed after generation of said start signal.

9. The process of claim 8, further comprising the steps of:

checking whether the office line communication via the public telephone office line is a conference communication, and when the office line communication is a conference communication terminating the count of time without transmitting the communicating duration data.

10. A method of indicating communicating duration of use of a public telephone office line, comprising the steps of:

in response to reception by a central processor of a number assigned to a receiver on a public telephone office line controlled by the central process, upon completion of dialing using a key telephone set, and connection by the central processing unit of the key telephone set with the receiver addressed by the number via the public telephone office line, driving a timer of the central processing unit with a start signal to enable the timer to make a count of time of the duration of a communication between the key telephone set and the receiver via the public telephone office line;

initializing the count of time of the duration of the office line communication when said start signal is generated;

driving said timer;

increasing the value of the count of time;

checking whether the office line communication via the public telephone office line is a conference communication, and when the office line communication is a conference communication terminating the count of time without transmitting the communicating duration data;

checking whether the public telephone office line communication is with a key telephone subscriber when the public telephone office line communication is a conference communication, and terminating the process without transmitting the communicating duration data when the public telephone office line communication is not with a key telephone subscriber;

producing communicating duration data representing the count of time when the public telephone office line is conducting an office line communication with the key telephone set;

producing a position value for a display of a display at a corresponding key telephone set of communicating duration data in units of "seconds" and "minutes"; and transmitting the communicating duration data to the corresponding key telephone set.

11. The method of claim 10, further comprising the steps of:

making a determination of whether one minute has elapsed after increasing a count of "seconds" of the communicating duration data by one;

initializing the count of "seconds" to "zero", when one minute of said count of time has elapsed, and increasing a count of "minutes" by one; and initializing the count of "minutes" to "zero" only when a fixed value of "minutes" has elapsed after generation of said start signal.

* * * * *